(12) United States Patent
Ataka et al.

(10) Patent No.: US 9,417,049 B2
(45) Date of Patent: Aug. 16, 2016

(54) ROTATIONAL ANGLE DETECTING DEVICE (71) Applicant: ALPS ELECTRIC CO., LTD., Ota-ku, Tokyo (JP)

(72) Inventors: Ryuji Ataka, Tokyo (JP); Yuzuru Ito, Tokyo (JP); Sadayuki Amako, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 44 days.

(21) Appl. No.: 14/585,386

(22) Filed: Dec. 30, 2014

(65) Prior Publication Data
US 2015/0192403 A1 Jul. 9, 2015

(30) Foreign Application Priority Data

Jan. 8, 2014 (JP) ................................. 2014-001474

(51) Int. Cl.
*G01B 7/30* (2006.01)
*G01D 5/165* (2006.01)
*H01C 10/32* (2006.01)

(52) U.S. Cl.
CPC *G01B 7/30* (2013.01); *G01D 5/165* (2013.01); *H01C 10/32* (2013.01)

(58) Field of Classification Search
CPC ........................................................ G01B 7/30

USPC ............ 324/71.1, 225, 207.25, 714; 318/286, 318/661
See application file for complete search history.

(56) References Cited

U.S. PATENT DOCUMENTS

| | | | | |
|---|---|---|---|---|
| 5,027,648 A | * | 7/1991 | Filleau | B62D 15/02 73/117.02 |
| 5,589,779 A | * | 12/1996 | Micko | G01D 5/165 324/714 |
| 5,617,000 A | * | 4/1997 | Mizuta | H02P 6/16 318/663 |

FOREIGN PATENT DOCUMENTS

JP 63-18102 8/1988

* cited by examiner

*Primary Examiner* — Tung X Nguyen
*Assistant Examiner* — Neel Shah
(74) *Attorney, Agent, or Firm* — Hunton & Williams LLP (57) ABSTRACT

A rotational angle detecting device includes a resistor of which one end is connected to the power source and the other end is grounded, a rotary potentiometer having two wipers which come into sliding contact with the surface of the resistor, a control unit which detects voltage applied to each of the wipers depending on the positions thereof upon the surface of the resistor, two resistors connected at one end to each of the two wipers, and switching means which switch the connection state between the other end of the two resistors and the power source under control of the control unit.

2 Claims, 6 Drawing Sheets

ROTATIONAL ANGLE DETECTING DEVICE

CLAIM OF PRIORITY

This application contains subject matter related to and claims the benefit of Japanese Patent Application No. 2014-001474 filed on Jan. 8, 2014, the entire contents of which is incorporated herein by reference.

BACKGROUND OF THE DISCLOSURE

1. Field of the Disclosure

Embodiments of the present disclosure relate to a rotational angle detecting device using a potentiometer, and more particularly relate to a rotational angle detecting device which can prevent false detection.

2. Description of the Related Art

Conventionally, a rotational angle detecting device uses a potentiometer having two wipers at different wiping positions, as a rotational angle sensor, to detect rotational angle of a rotating shaft from change in potential output from the two wipers.

In a case of using a potentiometer as a rotational angle sensor, dead bands are formed near the ends of a resistor, and in a case where one wiper is situated at a boundary between the resistor and dead band, slight contact between the wiper and the resistor may result in false detection due to output of intermediate potential between the greatest potential and smallest potential as the output potential, in the same way as with the other wiper.

Figure 6:
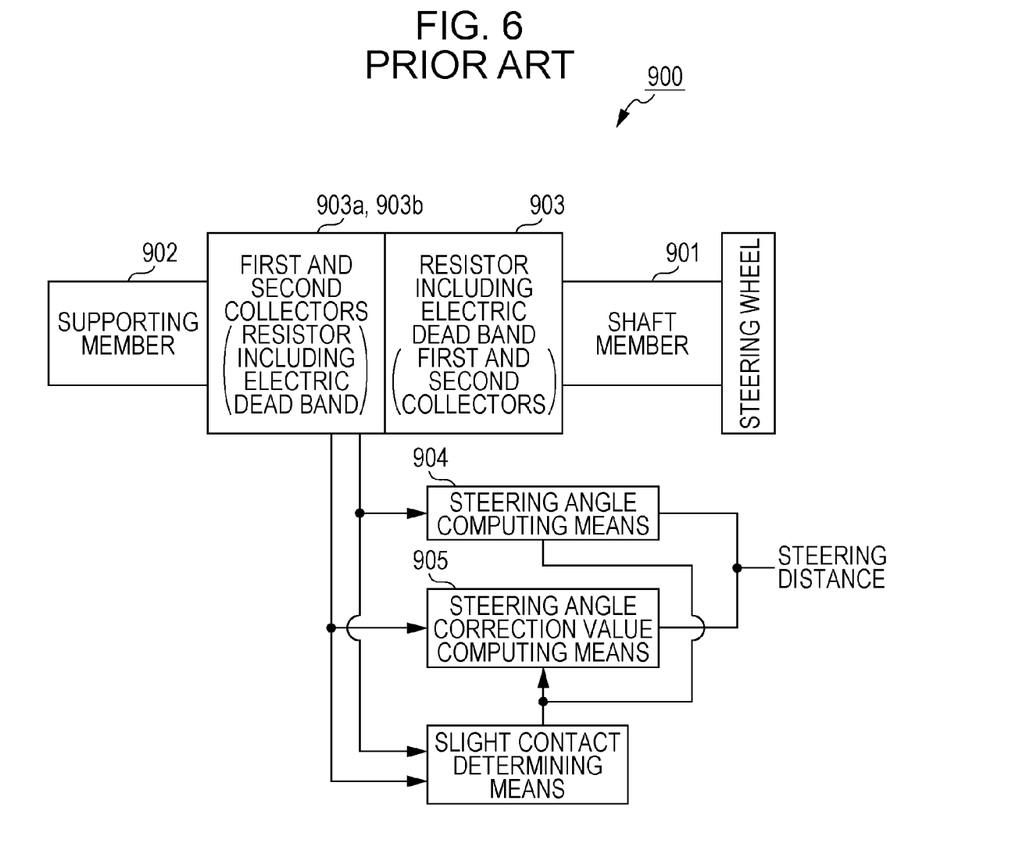
FIG. 6 is a diagram illustrating a steering angle detecting device (rotational angle detecting device) according to conventional art.

FIG. 6 illustrates a conventional example described in Japanese Unexamined Patent Application Publication No. 63-186102. A steering angle detecting device (rotational angle detecting device) 900 includes a shaft member 901, a supporting member 902, a resistor 903, first and second collectors 903a and 903b disposed on the resistor 903, steering angle calculating means 904, and steering angle correction computing means 905. A technique is disclosed where the steering angle calculating means 904 and steering angle correction computing means 905 detect and correct an angle from detection signals from the first collector 903a and second collector 903b, from the last time of sampling and this time of sampling.

However, the above-described conventional example has a problem in that false detection of angle may occur in a case where a collector (wiper) stays in slight contact and continues to output intermediate potential, since the angle is detected and corrected based on detection signals from the last time of sampling and this time of sampling.

These and other drawbacks exist.

SUMMARY OF THE DISCLOSURE

According to various embodiments, a rotational angle detecting device includes: a rotary potentiometer including a resistor of which one end is connected to a power source and the other end is grounded, and two wipers in sliding contact with a surface of the resistor; a control unit configured to detect voltage applied to the two wipers by being in sliding contact with the surface of the resistor; two resistors, one end of each of which is in contact with each of the two wipers; and switching means configured to switch a contact state between the other end of the two resistors and the power source, under control of the control unit.

According to this configuration, the two resistors can be switched between a state not connected to the power source and a state connected to the power source, so a composite resistance value of resistance between the two wipers and the power source can be changed. Accordingly, the value of the composite resistance due to the resistors being connected can be made smaller than the value of the contact resistance occurring in a state where one wiper is in slight contact, so the output of one wiper changes greatly and the output voltage becomes high. The other wiper is in sliding contact on the resistor, so change in the output voltage is small even if the resistors are connected. This change enables determination that the other wiper is upon the resistor, so the operating position can be correctly detected. Accordingly, a rotational angle detecting device can be provided where false detection can be prevented even in a state where one wiper stays in slight contact.

In a state in which the two resistors are not connected to the power source and intermediate voltage is input from both of the two wipers, the control unit may so control the switching means that a rotational angle is detected from voltage output from the two wipers in a state where the two resistors are connected to the power source.

Also, in a case where the two resistors are not in contact with the power source and intermediate voltage is output from both of the two wipers, the control unit may control the switching means so that the rotational angle is detected from the voltage of the two wipers in a state where the two resistors are connected to the power source.

DETAILED DESCRIPTION OF THE DISCLOSURE

The following description is intended to convey a thorough understanding of the embodiments described by providing a number of specific embodiments and details involving an rotational angle detecting device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1A:
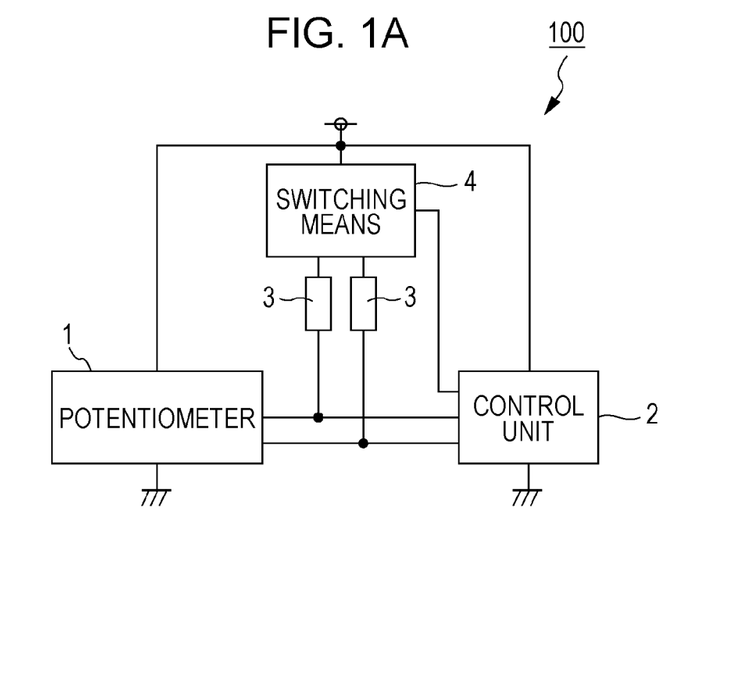
FIGS. 1A and 1B are diagrams illustrating the configuration of a rotational angle detecting device according to an example embodiment of the present disclosure.
Figure 1B:
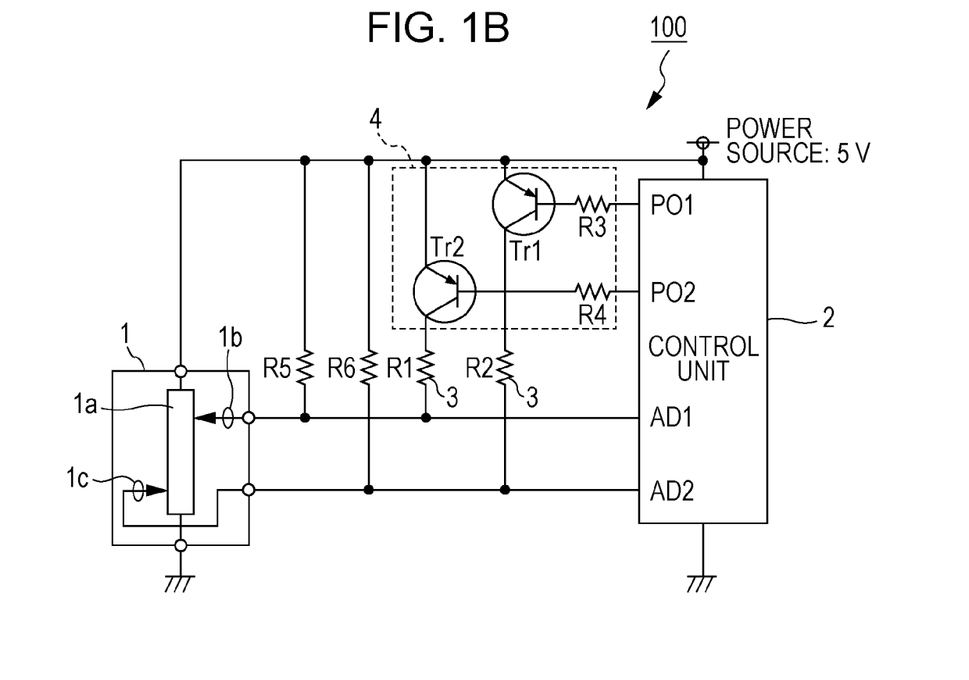
Figure 2A:
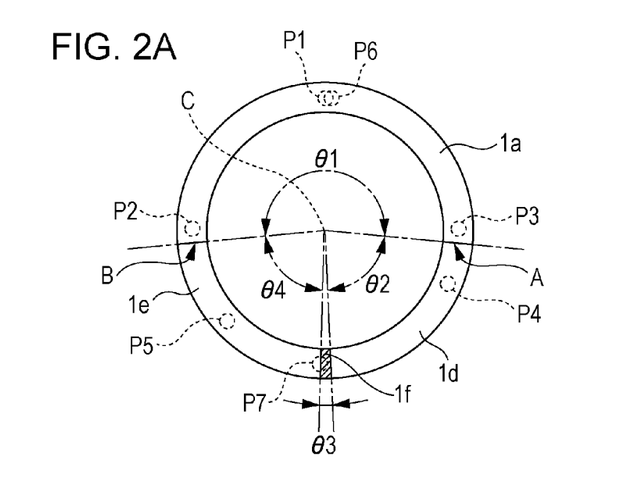
FIGS. 2A and 2B are diagrams describing operation of a potentiometer used in the rotational angle detecting device.
Figure 2B:
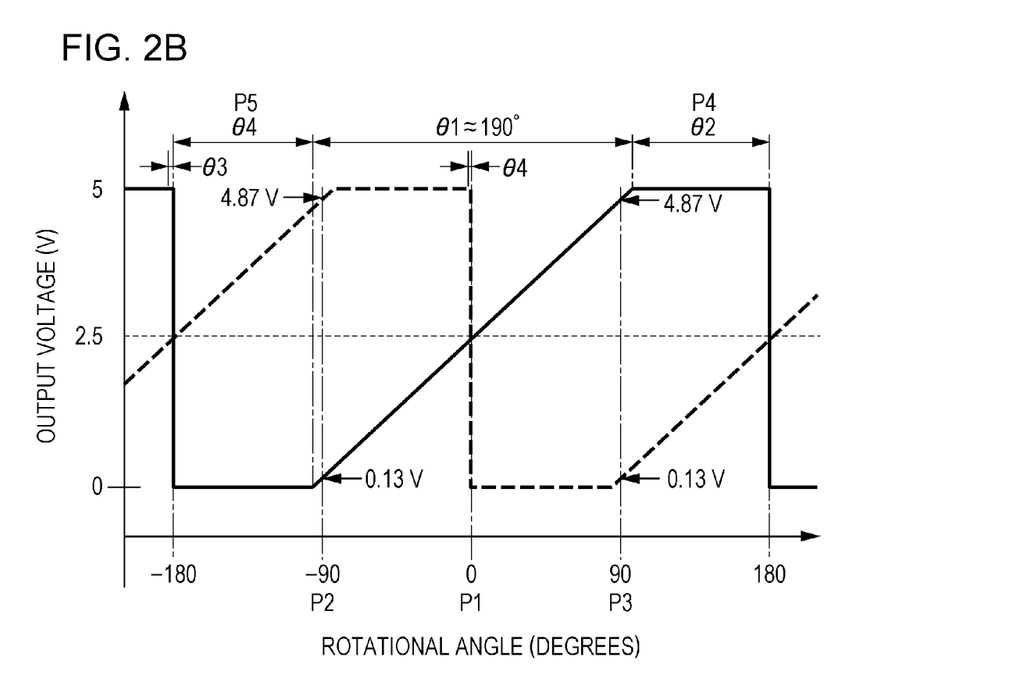

The configuration of a rotational angle detecting device 100 according to an example embodiment will first be described, with reference to FIGS. 1A through 2B. FIGS. 1A through 2B are diagrams illustrating the configuration of a rotational angle detecting device 100 according to the an example embodiment, in which FIG. 1A is a block diagram illustrating the configuration of the rotational angle detecting device 100, and FIG. 1B is a circuit diagram of the rotational angle detecting device 100. FIGS. 2A and 2B are diagrams describing operation of a potentiometer 1 used in the rotational angle detecting device 100, in which FIG. 2A is a diagram for describing the position and movement of a resistor 1a and two wipers 1b and 1c, and FIG. 2B is a diagram illustrating the relationship between the positions of the two wipers and output voltage.

As illustrated in FIG. 1A, the rotational angle detecting device 100 may include a rotary potentiometer 1, a control unit 2, two resistors 3, and switching means 4. The rotational angle detecting device 100 also may include a first pull-up resistance R5 and a second pull-up resistance R6, as illustrated in FIG. 2B.

The potentiometer 1 may include the resistor 1a, and the two wipers which are a first wiper 1b and second wiper 1c, as illustrated in FIG. 1B. One end of the resistor 1a may be connected to a power source, and the other end may be grounded by connection to the reference potential of the power source. Description will be made in the present embodiment with the total resistance value of the resistor 1a being 10 kiloohms (hereinafter written kΩ) the reference potential being 0 volts (hereinafter written V), and the voltage of the power source being 5 V. The two wipers may be in sliding contact with the surface of the resistor 1a, so the voltage at the wipers is 0 to 5 V, corresponding to the sliding position of the wipers. The two wipers, first wiper 1b and second wiper 1c, each may be connected to the control unit 2.

The resistor 1a of the potentiometer 1 may be formed at an arc position corresponding to an inner angle θ1 centered on an axis of rotation C of the potentiometer 1, as illustrated in FIG. 2A. One end of the resistor 1a may be connected to the power source via a first electroconductive pattern 1d, and the other end may be grounded via a second electroconductive pattern 1e.

The first electroconductive pattern 1d may be formed at an arc position corresponding to an inner angle θ2 centered on the axis of rotation C of the potentiometer 1, as illustrated in FIG. 2A, and may come into contact with the resistor 1a at the portion indicated by "A" in FIG. 2A. The second electroconductive pattern 1e may be formed at an arc position corresponding to an inner angle θ4 centered on the axis of rotation C of the potentiometer 1, as illustrated in FIG. 2A, and may come into contact with the resistor 1a at the portion indicated by "B" in FIG. 2A.

A dead band 1f may be formed in the range of an inner angle θ3 by an insulator, so that there will be no short-circuiting of the first electroconductive pattern 1d and second electroconductive pattern 1e by the first wiper 1b or side edge 21c. Note that in the present embodiment, the inner angle θ1 is approximately 190 degrees, θ2 and θ4 each 80 degrees, and θ3 10 degrees.

The first wiper 1b and second wiper 1c may be disposed at positions facing each other across the axis of rotation C, so that in a case where the first wiper 1b is at a position P1 on the upper face of the resistor 1a illustrated in FIG. 2A, the second wiper 1c is positioned above the dead band 1f. Also, in a case where the first wiper 1b is at a position P2 on the resistor 1a illustrated in FIG. 2A, the second wiper 1c is positioned at a position P3.

The relationship between the positions of the first wiper 1b and second wiper 1c and the output voltage will be described with reference to FIG. 2B. FIG. 2B is a diagram illustrating the relationship between the rotational angle of the potentiometer 1, and the voltage output in accordance with the positions of the first wiper 1b and second wiper 1c. The solid line in FIG. 2B represents the output voltage of the first wiper 1b and the dashed line represents the output voltage of the second wiper 1c.

In a case where the first wiper 1b is at the position P1 illustrated in FIG. 2A, the first wiper 1b may be situated at approximately the middle of the resistor 1a, so the output voltage is 2.5 V which is half that of the power source voltage. When the first wiper 1b is within the range of the inner angle θ1 where the resistor 1a exists, voltage proportionate to the rotational angle may be output as illustrated in FIG. 2B. The total resistance of the resistor 1a is 10 kΩ, which is distributed over a range of approximately 190 degrees, so the voltage changes by 0.13 V every 5 degrees of rotational angle.

In a case where the first wiper 1b is at the position P2 illustrated in FIG. 2A, the first wiper 1b may be situated at a position rotated approximately 5 degrees on the P1 side from a contact B to the second electroconductive pattern 1e, so the output voltage is 0.13 V as calculated from the resistance ratio of the resistor 1a. In this case, the second wiper 1c may be situated at the position P3 in FIG. 2A, so the output voltage is 4.87 V, obtained in the same way.

In a case where the first wiper 1b is at the position P3 illustrated in FIG. 2A, the first wiper 1b may be situated at a position rotated approximately 5 degrees on the P1 side from a contact A to the first electroconductive pattern 1d, so the output voltage is 4.87 V as calculated from the resistance ratio of the resistor 1a. In this case, the second wiper 1c may be situated at the position P2 in FIG. 2A, so the output voltage is 0.13 V, obtained in the same way.

In a case where the first wiper 1b is in the range of the inner angle θ2, such as at P4 in FIG. 2B, the first wiper 1b may be in contact with the first electroconductive pattern 1d connected to the power source, the power source voltage of 5 V may be output without change. In a case where the first wiper 1b is in the range of the inner angle θ4, such as at P5 in FIG. 2B, the first wiper 1b may be in contact with the second electroconductive pattern 1e connected to the reference potential, so 0 V is output.

In a case where the first wiper 1b is in the range of the inner angle θ3 where the dead band 1f exists, the first wiper 1b may be in an insulated state, and the output voltage is indeterminate. The first pull-up resistance R5 may be connected between the first wiper 1b and the power source in the present embodiment, as illustrated in FIG. 1B, so as to realize a configuration of pull-up by the power source voltage, so the power source voltage is output in this range. The second wiper 1c functions in the same way as the first wiper 1b at a position shifted by a rotational angle of 180 degrees, so the output voltage is output as indicated by the dashed line in FIG. 2B. The second pull-up resistance R6 may be connected between the second wiper 1c and the power source, as illustrated in FIG. 1B.

The control unit 2 may include a first analog voltage input port AD1, a second analog voltage input port AD2, a first output port PO1, and a second output port PO2. The first wiper 1b of the potentiometer 1 may be connected to the first analog voltage input port AD1, the second wiper 1c may be connected to the second analog voltage input port AD2, and the switching means 4 may be connected to the first output port PO1 and second output port PO2, as illustrated in FIG. 1B.

The voltage applied to each of the two wipers depending on the positions thereof upon the surface of the resistor 1a may be input to the first analog voltage input port AD1 and second analog voltage input port AD2 of the control unit 2. The control unit 2 may perform analog-to-digital conversion of analog signals from the input voltage into digital signals (hereinafter referred to as "AD conversion"), detects resulting voltage values as voltage data, and may perform computation based on the detected voltage values. Control signals to control the switching means 4 based on the results of the computation performed at the control unit 2 may be output to the output ports PO1 and PO2. The control unit 2 also may be provided with timer functions and memory (omitted from illustration), and accordingly can manage control intervals by the timer functions, and can store the obtained voltage values and calculation results from the voltage values.

The two resistors 3 each may have one end connected to the two wipers, as illustrated in FIG. 1A. When there is need to distinguish these two resistors 3, the resistors 3 connected to the first wiper 1b will be denoted by R1, and the resistors 3 connected to the second wiper 1c will be denoted by R2, as illustrated in FIG. 1B. The other end of each of the two resistors 3 may be connected to the switching means 4. The resistance value of the two resistors 3 is described as 100 kΩ in the present embodiment.

The switching means 4 may be connected to the power source, the control unit 2, and the other end of the two resistors 3, as illustrated in FIG. 1A. The switching means 4 may be made up of two transistors, first transistor Tr1 and second transistor Tr2, a base resistance R3 and a base resistance R4, as illustrated in FIG. 1B. The two transistors Tr1 and Tr2 each may have three terminals, which may be the base, emitter, and collector. The emitters of the two transistors Tr1 and Tr2 may be connected to the power source. The collector of the first transistor Tr1 may be connected to the other end of R1 of the two resistors 3, and the collector of the second transistor Tr2 may be connected to the other end of R2 of the two resistors 3. The base of the first transistor Tr1 is connected to the first output port PO1 of the control unit 2 via the base resistance R3, and the base of the second transistor Tr2 may be connected to the second output port PO2 of the control unit 2 via the base resistance R4. The current flowing through each base of the two transistors Tr1 and Tr2 may be turned on and off by the output of the first output port PO1 and second output port PO2, thereby switching one and off between the emitters and collectors of the two transistors Tr1 and Tr2. Thus, the connection state between the other end of the two resistors 3 and the power source may be switched under control of the control unit 2.

The first pull-up resistance R5 may have one end connected to the first wiper 1b, and the other end connected to the power source, for pull-up of the first wiper 1b so that output voltage will not be insufficient when the first wiper 1b is in the dead band 1f of the potentiometer 1. The second pull-up resistance R6 may have one end connected to the second wiper 1c, and the other end connected to the power source, for pull-up of the second wiper 1c so that output voltage will not be insufficient when the second wiper 1c is in the dead band 1f of the potentiometer 1.

The values of the first pull-up resistance R5 and second pull-up resistance R6 may be set small enough that influence on the output voltage as to the rotation angle of the potentiometer 1 is tolerable. In the present embodiment, the value of the first pull-up resistance R5 and the second pull-up resistance R6 may be 1 megaohm (hereinafter written MΩ).

Figure 3A:
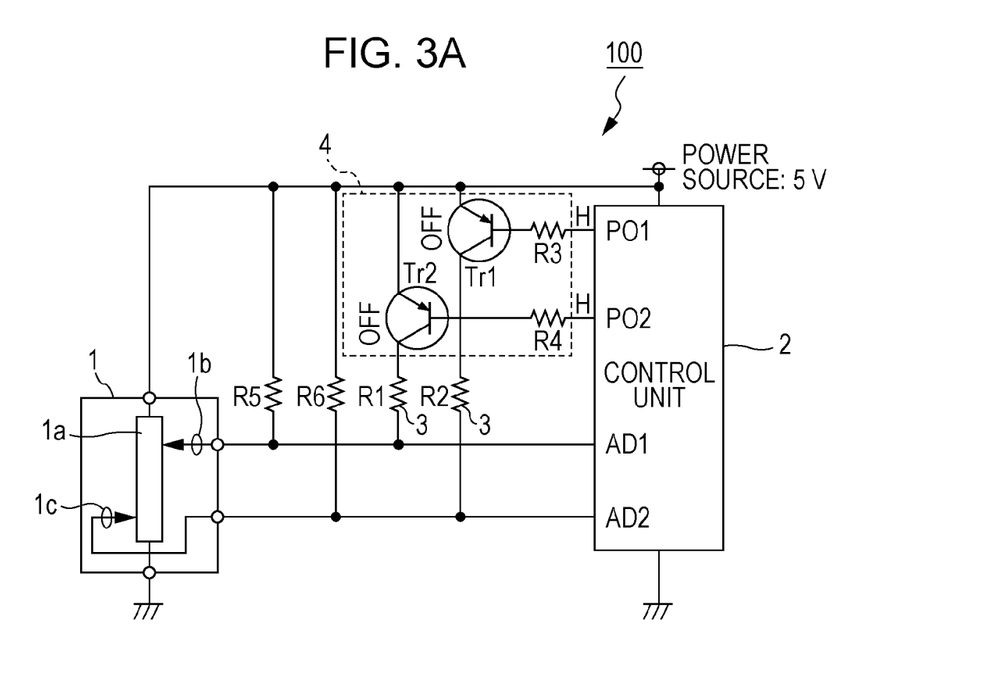
FIGS. 3A and 3B are diagrams describing operation of the rotational angle detecting device according to an example embodiment of the present disclosure.
Figure 3B:
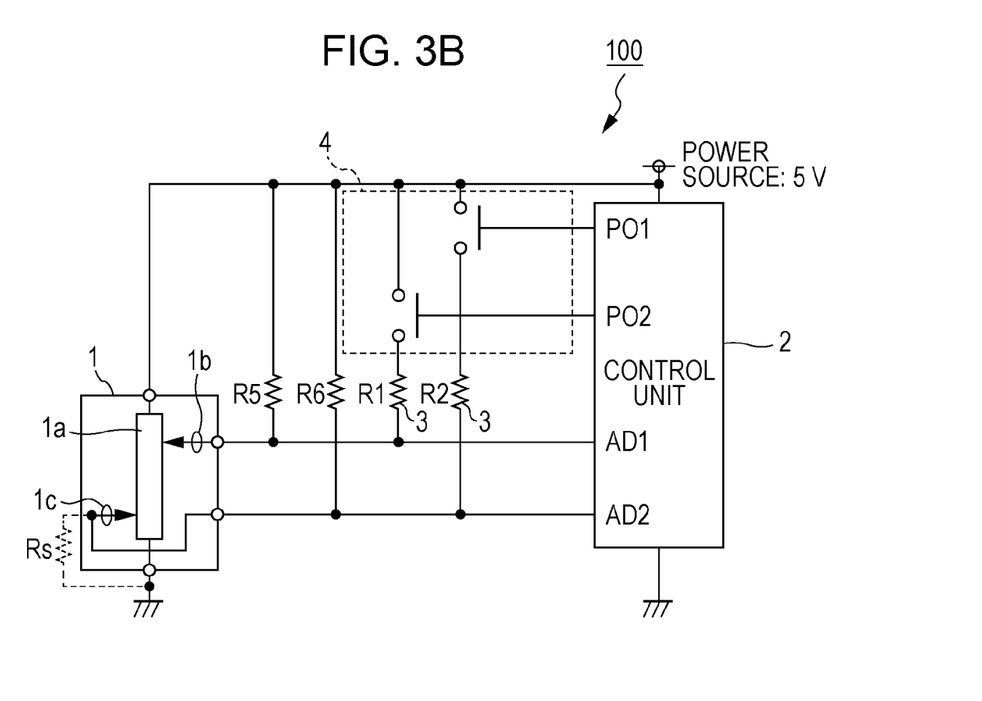
Figure 4A:
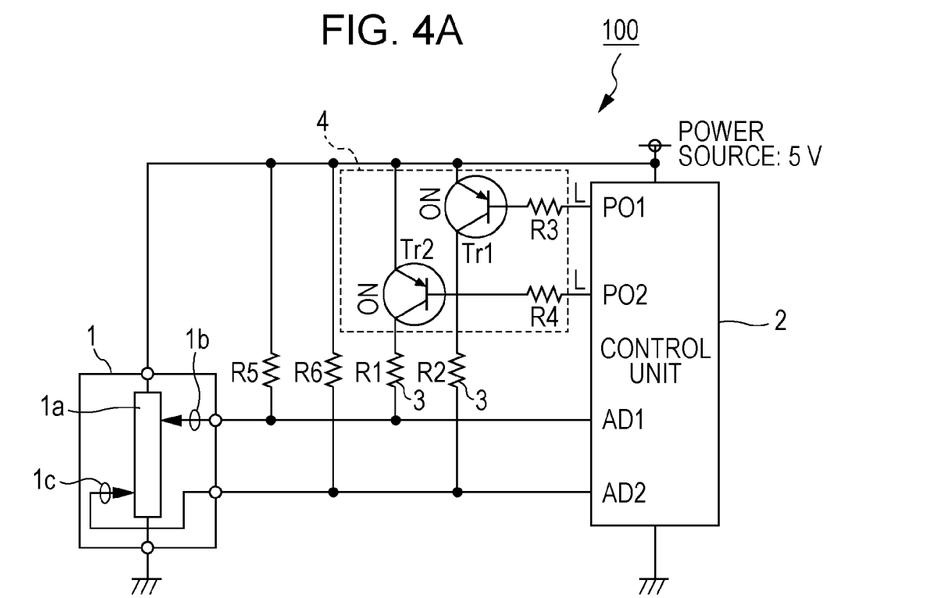
FIGS. 4A and 4B are diagrams describing operation of the rotational angle detecting device according to an example embodiment of the present disclosure.
Figure 4B:
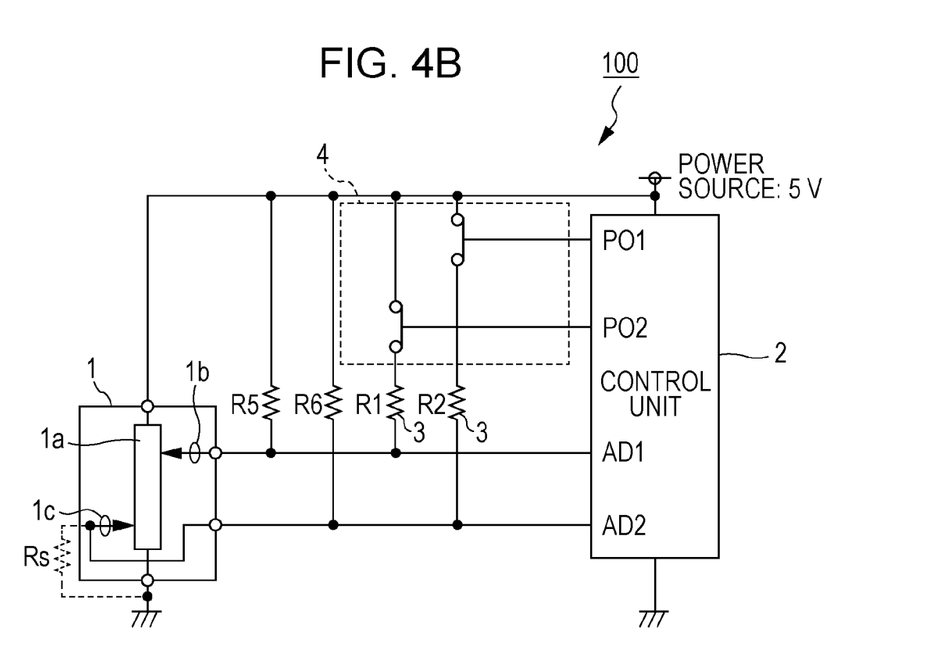
Figure 5A:
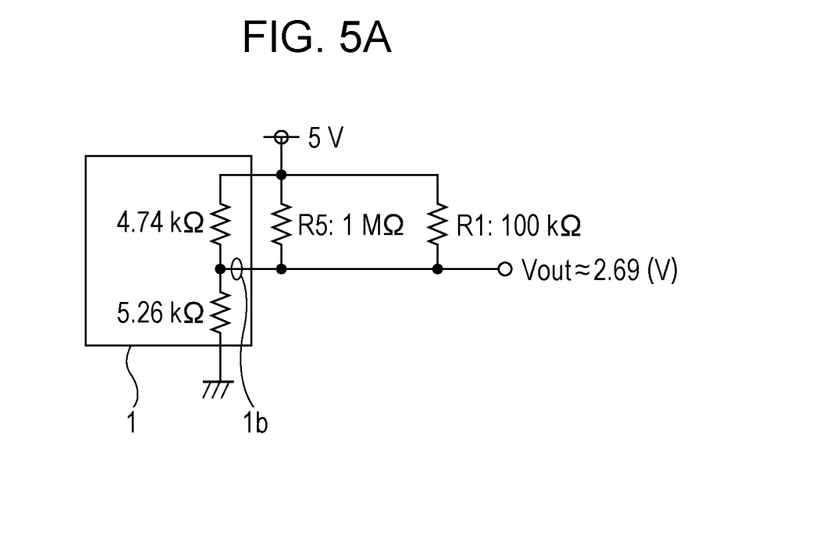
FIGS. 5A and 5B are diagrams describing operation of the rotational angle detecting device according to an example embodiment of the present disclosure.
Figure 5B:
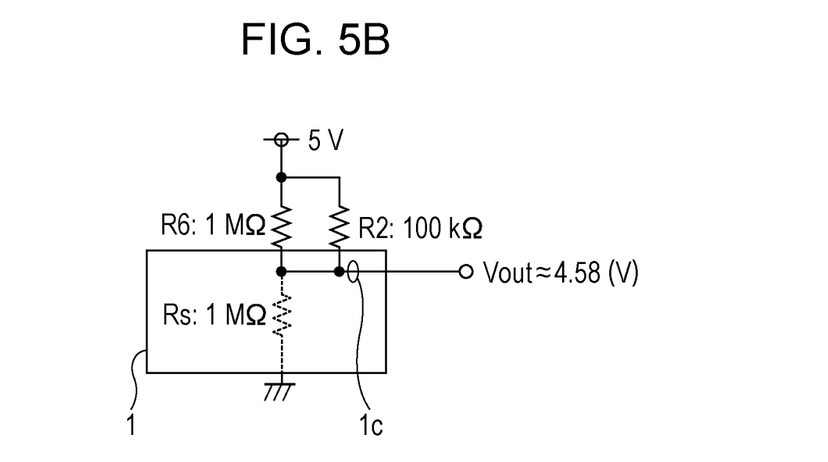

Next, the operations of the rotational angle detecting device 100 will be described with reference to FIGS. 2A through 5B. FIGS. 3A and 3B are diagrams describing operation of the rotational angle detecting device 100 according to an example embodiment, illustrating operations in a case where the switching means 4 are off. FIG. 3A is a circuit diagram illustrating the output state of the first output port PO1 and second output port PO2 of the control unit 2, and FIG. 3B is an equivalent circuit diagram illustrating a state where the switching means 4 are at an off state and the second wiper 1c is in slight contact. FIGS. 4A and 4B are diagrams describing operation of the rotational angle detecting device 100 according to the embodiment, illustrating operations in a case where the switching means 4 are on. FIG. 4A is a circuit diagram illustrating the output state of the first output port PO1 and second output port PO2 of the control unit 2, and FIG. 4B is an equivalent circuit diagram illustrating a state where the switching means 4 are at an on state and the second wiper 1c is in slight contact. FIGS. 5A and 5B are diagrams describing operation of the rotational angle detecting device 100 according to the embodiment, illustrating equivalent circuits in a case of connecting to the wipers 1b and 1c where the resistors 3 have been connected. FIG. 5A is an equivalent circuit diagram illustrating a state where the first wiper 1b is at P6, and FIG. 5B is an equivalent circuit diagram illustrating a state where the second wiper 1c is at P7.

In the initial state, the control unit 2 may set the switching means 4 to an off state as illustrated in FIG. 3A, so the same 5 V voltage as the power source voltage is output to the first output port PO1 and second output port PO2. The output in this state is referred to as an "H" level. In a case where 0 V is output to the first output port PO1 or second output port PO2, the output in this state is referred to as an "L" level. "H" level is being output from the first output port PO1 and second output port PO2 of the control unit 2, so the switching means 4 are at an off state. The first resistor R1 and the second resistor R2 are not connected to the power source in this state, as illustrated in FIG. 3B.

The control unit 2 may detect the output voltage from the first wiper 1b and the output voltage from the second wiper 1c, respectively. In a case where the voltage value output from the first wiper 1b is in a range of approximately 0.13 V or greater but smaller than 2.5 V, and the output of the second wiper 1c is 4.87 V or greater, the control unit 2 may compute the rotational angle from the voltage value of the first wiper 1b. In this case, the first wiper 1b may be positioned between P2 and P1 illustrated in FIGS. 2A and 2B.

In a case where the voltage value output from the first wiper 1b is in a range of greater than 2.5 V but 4.87 V or smaller, and the output of the second wiper 1c is smaller than 0.13 V, the control unit 2 may compute the rotational angle from the voltage value of the first wiper 1b. In this case, the first wiper 1b may be positioned between P1 and P3 illustrated in FIGS. 2A and 2B.

In a case where the voltage value output from the second wiper 1c is in a range of 0.13 V or greater but smaller than 2.5 V, and the output of the first wiper 1b is 4.87 V or greater, the control unit 2 may compute the rotational angle from the voltage value of the second wiper 1c. In this case, the second wiper 1c may be positioned between P2 and P1 illustrated in FIGS. 2A and 2B.

In a case where the voltage value output from the second wiper 1c is in a range of greater than 2.5 V but 4.87 V or smaller, and the output of the first wiper 1b is smaller than 0.13 V, the control unit 2 may compute the rotational angle from the voltage value of the second wiper 1c. In this case, second wiper 1c may be positioned between P1 and P3 illustrated in FIGS. 2A and 2B.

In a case where the first wiper 1b has rotated by 5 degrees from P1 towards P3 and reached P6 illustrated in FIG. 2A, the second wiper 1c is at the position P7, and thus is situated between the dead band 1f and the second electroconductive pattern 1e. In a case where the second wiper 1c is in slight contact with the second electroconductive pattern 1e at the position indicated by P7, this is equivalent to a contact resistance Rs which occurs through the slight contact being connected between the second wiper 1c and the reference potential, as illustrated in the equivalent circuit in FIG. 3B.

In a case where the contact resistance Rs due to the slight contact is 1 MΩ, the power source voltage may be divided between the contact resistance Rs and second pull-up resistance R6, so 2.5 V is output for the output of the second wiper 1c. At this time, 2.63 V voltage may be output for the output of the first wiper 1b.

In such a case where the switching means 4 are off and an intermediate voltage around 2.5 V is output from both the first wiper 1b and second wiper 1c in a state where the two resistors 3 are not connected to the power source, the control unit 2 may control the switching means 4 to turn on. The control unit 2 may output "L" level to the first output port PO1 and second output port PO2 so as to turn the switching means 4 on, as illustrated in FIG. 4A, whereby the two resistors 3 are connected to the power source as illustrated in the equivalent circuit in FIG. 4B.

In a case where the voltage output to the first wiper 1b in the state illustrated in FIG. 3B is 2.63 V, a state where the two resistors 3 are connected as illustrated in FIG. 4B is equivalent to the resistors being connected as illustrated in FIG. 5A. Accordingly, the voltage output to the first wiper 1b is 2.69 V, which differs only by 0.06 V.

In a case where the voltage output to the second wiper 1c in the state illustrated in FIG. 3B is 2.5 V, a state where the two resistors 3 are connected as illustrated in FIG. 4B is equivalent to the resistors being connected as illustrated in FIG. 5B. Accordingly, the voltage output to the second wiper 1c is 4.58 V, which differs by more than 2 V.

Accordingly, whether the second wiper 1c is between the dead band 1f and second electroconductive pattern 1e and is in slight contact with the second electroconductive pattern 1e can be determined. Thus, the control unit 2 can calculate the rotational angle using the voltage value output from the first wiper 1b in a state where the switching means 4 is off, so the rotational angle can be detected without false detection. In a case where a margin of error is tolerated regarding the angle to be detected, the rotational angle can also be computed using the voltage value output from the first wiper 1b in a state where the switching means 4 are on. Thus, the rotational angle can be detected from the voltage output from the two wipers 1b and 1c in a state where two resistors 3 are connected to the power source.

The rotational angle can also be detected by the same procedures in a case where the first wiper 1b is at the position P7 illustrated in FIG. 2A and the second wiper 1c is at the position P6, so that the first wiper 1b comes into slight contact with the second electroconductive pattern 1e. It should be noted that the output voltage values of the wipers illustrated above are general figures, and that in reality there is some fluctuation due to error in the values of the potentiometer 1 and resistors 3.

The rotational angle detecting device 100 according to an example embodiment includes a resistor 1a of which one end is connected to the power source and the other end is grounded, a rotary potentiometer 1 having two wipers 1b and 1c which come into sliding contact with the surface of the resistor 1a, a control unit 2 which detects voltage applied to each of the two wipers 1b and 1c depending on the positions thereof upon the surface of the resistor 1a, two resistors 3 connected at one end to each of the two wipers, and switching means 4 which switch the connection state between the other end of the two resistors 3 and the power source under control of the control unit 2.

Accordingly, the two resistors 3 can be switched between a state not connected to the power source and a state connected to the power source, so a composite resistance value of resistance between the two wipers 1b and 1c and the power source can be changed. Accordingly, the value of the composite resistance value due to the resistors 3 being connected can be made smaller than the value of the contact resistance Rs occurring in a state where one wiper is in slight contact, so the output of one wiper changes greatly and the output voltage becomes high. The other wiper may be in sliding contact on the resistor 1a, so change in the output voltage is small even if the resistors 3 are connected. This change enables determination that the other wiper is upon the resistor 1a, so the operating position can be correctly detected. Accordingly, a rotational angle detecting device can be provided where false detection can be prevented even in a state where one wiper stays in slight contact.

Also, only in a case where the two resistors 3 are not in contact with the power source and intermediate voltage is output from both of the two wipers 1b and 1c, the control unit 2 of the rotational angle detecting device 100 according to the present embodiment may control the switching means 4 so that the rotational angle is detected from the voltage output from the two wipers 1b and 1c in a state where the two resistors 3 are connected to the power source.

Accordingly, the switching means 4 may be controlled only in a case where intermediate voltage is voltage output from the two wipers 1b and 1c, so that the rotational angle is detected from voltage output from the two wipers 1b and 1c in a state where the two resistors 3 are connected to the power source. Thus, the rotational angle can be efficiently detected with few times required to control the switching means 4.

While the rotational angle detecting device 100 according to example embodiments of the present disclosure has been described above, the present invention is not restricted to the above embodiment, and various modifications may be made without departing from the essence of the invention. For example, the following modifications may be made, all of which belong to the technical scope of the present embodiment.

(1) While an example has been illustrated where the first pull-up resistance R5 and second pull-up resistance R6 are each connected between the two wipers 1b and 1c and the power source, the first pull-up resistance R5 and second pull-up resistance R6 may be omitted. In this case as well, even if the two wipers 1b and 1c both output intermediate potential, the control unit 2 can still determine which wiper is situated on the resistor 1a by controlling the switching means 4 so that the other end of the two resistors 3 are connected to the power source.

(2) While description states specific numerical values for the total resistance value of the potentiometer 1, the values of the two resistors 3, and the values of the first pull-up resistance R5 and second pull-up resistance R6, the resistance values may be changed as suitable.

(3) While an example has been illustrated where the switching means 4 are configured including two transistors, a configuration may be made using field-effect transistors (FET) or other switching devices.

(4) While an example has been illustrated where the two resistors 3 are connected to the power source in a case where the switching means 4 is in an on state, a modification may be made where the two resistors 3 are connected to the reference potential when the switching means 4 is in the on state. The first pull-up resistance R5 and second pull-up resistance R6 also may be changed to pull-down resistance and connected to the reference potential.

(5) While an example has been illustrated where the switching means 4 and the control unit 2 are configured separately, an integral configuration may be made where the control unit has switching means built in. For example, a microprocessor unit (MPU) or the like having a function where whether or not to connect pull-up resistances to the analog voltage input ports of the control unit may be used in such a configuration.

(6) While the description uses 2.5 V as a representative value of intermediate potential, without stating a specific range, contact resistance occurring due to slight contact is not only unstable, but also affected by temperature, humidity, and so forth, to change. Accordingly, the range of voltage at which the switching means are controlled may be determined as appropriate according to the equipment to which the rotational angle detecting device is to be applied conditions, and so forth.

The embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A rotational angle detecting device comprising:
a rotary potentiometer including
a resistor of which one end is connected to a power source and the other end is grounded, and
two wipers in sliding contact with a surface of the resistor;
a control unit configured to detect voltage applied to the two wipers by being in sliding contact with the surface of the resistor;
two resistors, one end of each of which is in contact with each of the two wipers; and
switching means configured to switch a contact state between the other end of the two resistors and the power source, under control of the control unit.

2. The rotational angle detecting device according to claim 1,
wherein, in a state in which the two resistors are not connected to the power source and intermediate voltage is input from both of the two wipers, the control unit so controls the switching means that a rotational angle is detected from voltage output from the two wipers in a state where the two resistors are connected to the power source.

* * * * *